(12) United States Patent
Mizuno et al.

(10) Patent No.: US 7,708,044 B2
(45) Date of Patent: May 4, 2010

(54) MOLDING APPARATUS FOR WET FRICTION MATERIAL

(75) Inventors: Masayuki Mizuno, Seto (JP); Wataru Tomita, Nagoya (JP)

(73) Assignee: Aisin Kako Kabushiki Kaisha, Toyota-Shi, Aichi-Ken (JP)

( * ) Notice: Subject to any disclaimer, the term of this patent is extended or adjusted under 35 U.S.C. 154(b) by 0 days.

(21) Appl. No.: 11/806,035

(22) Filed: May 29, 2007

(65) Prior Publication Data

US 2008/0175945 A1    Jul. 24, 2008

(30) Foreign Application Priority Data

May 30, 2006    (JP)    ............................. 2006-149549

(51) Int. Cl.
*B32B 37/00* (2006.01)
(52) U.S. Cl. .................... 156/583.1; 156/580; 100/194; 100/200; 100/208
(58) Field of Classification Search ................. 156/580, 156/581, 583.1; 100/193, 194, 199, 200, 100/208
See application file for complete search history.

(56) References Cited

U.S. PATENT DOCUMENTS 2,966,183 A * 12/1960 Werner ........................ 425/338
4,892,665 A * 1/1990 Wettlaufer .................. 210/770

FOREIGN PATENT DOCUMENTS

JP    3643018 B2    2/2005

* cited by examiner

*Primary Examiner*—James Sells
(74) *Attorney, Agent, or Firm*—Buchanan Ingersoll & Rooney PC

(57) ABSTRACT

A molding apparatus of a wet friction material has a pair of guide posts vertically extending on a molding apparatus main body. The pair of the guide posts passes through fifteen stages (sixteen pieces) of molding dies. A pair of pantograph-type open-close mechanisms is attached to opposite side surfaces of the molding dies. Thus, the molding dies are piled up on each other so as to come near to each other (mold clamping) and move apart from each other (mold opening). With the pantograph-type open-close link mechanism, all the molding dies are opened and closed at the same time. If the molding dies are slid at a speed of 200 mm/sec, it takes only 3.75 seconds (50 mm*15/200 mm=3.75 sec). It takes a double of that time or 7.5 seconds, that is a half of the time of a related art.

8 Claims, 8 Drawing Sheets

FIG. 8a
FIG. 8b
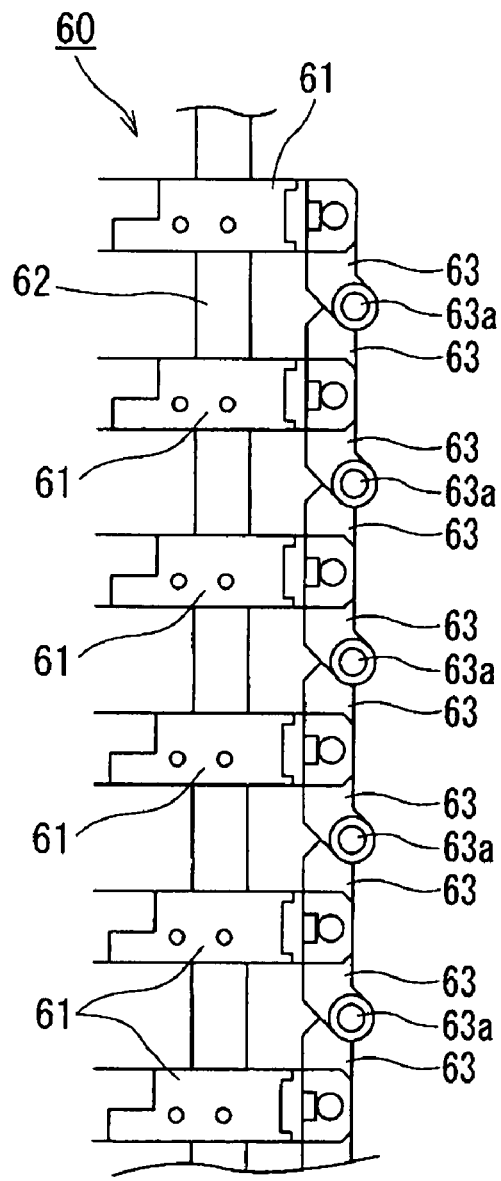
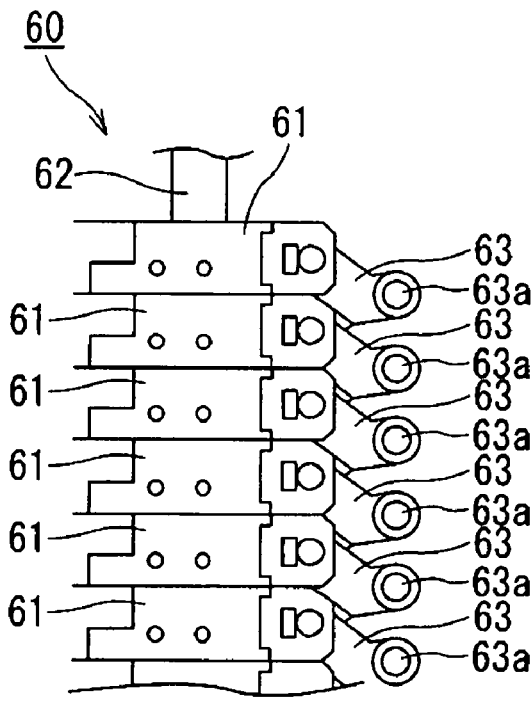

MOLDING APPARATUS FOR WET FRICTION MATERIAL

BACKGROUND OF THE INVENTION

1. Field of the Invention

This invention relates to a molding apparatus for a wet friction material that is manufactured by sequential steps including as a rate-determining step, i.e. a molding step or a heat press step of friction material segments on a core plate.

2. Description of the Related Art

One of commonly used wet friction materials for an automatic transmission has a ring-shaped friction material substrate, which is cut out of a friction material substrate, joined on one or both of opposite surfaces of a core metal of a flat ring shape with an adhesive. Another has a plurality of segment pieces or friction material segments joined on one or both surfaces of the core metal with an adhesive. For example, there is provided a segment-type wet friction material as shown in FIG. 6a. FIG. 6a is a plan view showing an overall structure of a segment-type wet friction material. FIG. 6b is a cross-sectional view showing a step of a manufacturing process of a wet-type friction material in which segment pieces are joined by adhesion to a core metal. FIG. 6c is a cross-sectional view showing a next step in which the adhering segment pieces are pressed for thickness setting.

As shown in FIG. 6a, a segment-type wet friction material 50 has twenty segment pieces 52 joined by adhesion respectively on opposite surfaces of a core plate 51 of a flat ring shape. The segment pieces 52 are made by cutting out of a friction material substrate. The adhering segment pieces 52 on both surfaces of the core metal 51 are pressed for thickness setting and heated for thermosetting. In a conventional manufacturing process of such a segment-type friction material 50, the friction material segments or the segment pieces are punched out from the friction material substrate one by one. Then, the punched-out segment pieces are stuck one by one on the surfaces of the core plate or the core metal on which a thermosetting adhesive is coated along an entire circumference thereof. That is, a punching-out step and a next sticking step are repeated twenty times. Accordingly, it takes much time to stick all the segment pieces. Consequently, there has taken place troubles or problems caused by the fact that property of the adhesive changes with time from the sticking of the first segment piece to the sticking of the last segment piece.

In view of the above problems, Japanese Patent Publication No. 3643018 discloses an invention of a manufacturing method of a wet friction material. The manufacturing method does not carry out the alternate steps of the punching-out of the friction material segment (segment piece) from a strip of the friction material substrate and the sticking of the punched segment piece on the core plate (core metal). Instead, the manufacturing method includes a storing step for storing a plurality of segment pieces in a circumferential manner on one surface of a holder and a sticking step for moving the one surface of the holder to a sticking surface of the core metal with an adhesive coated thereon so as to urge and stick the segment pieces held on the holder to the sticking surface of the core metal.

In case of the manufacturing process composed of the alternate steps of punching out of the segment piece and the sticking of the segment piece on the core metal, there arises a problem such as deterioration of positioning accuracy of the segment pieces due to the property change of the adhesive that is caused by taking much time for the sticking work. However, the manufacturing method described in Japanese Patent Publication No. 3643018 solves such problem. Moreover, it completes the sticking work of the segment pieces in a very short amount of time. As a result, the rate-determining step in the manufacturing process of the segment-type friction material becomes a heat press step (molding step) after sticking the plurality of the segment pieces on the entire circumference of the core metal.

An outline of the molding step is described referring to FIG. 6b. As described above, a group of twenty segment pieces 52 are stuck by the holder at fixed intervals as shown in FIG. 6a on one surface (front surface) of the flat ring-shaped core metal 51 on which a thermosetting adhesive is coated. Then, the core metal 51 is reversed and, in the same way, another group of twenty segment pieces 52 are stuck by the holder at fixed intervals as shown in FIG. 6a on a rear surface of the core metal 51 on which the thermosetting adhesive is coated. Thereafter, the core metal with the segment pieces 52 stuck on the opposite surfaces is set inside a shim 42 between an upper die 40A and a lower die 40B.

Then, the upper die 40A is lowered by a not-shown hydraulic cylinder. Alternatively, the lower die 40B may be lifted by a not-shown hydraulic cylinder. As shown in FIG. 6c, the two groups of the twenty segment pieces 52 are pressed respectively so that a total thickness of the core metal 51 and the two groups of the segment pieces 52 becomes equal to a thickness of the shim 42. In this state, the upper die 40A and the lower die 40B are heated at a temperature of 170° C. to 270° C. so as to set or harden the thermosetting adhesive coated on the both surfaces of the core metal 51. Thus, the segment-type wet friction material 50 shown in FIG. 6a is manufactured by sticking, hardening and fixing each group of the twenty segment pieces 52 on the opposite surfaces of the core metal 51.

In the manufacturing process of the above-mentioned segment-type wet friction material 50, it is necessary to decrease a manufacturing time per one friction material as short as possible for reducing costs. For such purpose, it is very important to raise a manufacturing efficiency in the molding step that requires a fixed time period (30 seconds to 90 seconds) in order to heat and set or harden the thermosetting adhesive. Therefore, a multi-stage molding die with vertically built-up molding dies is proposed in order to carry out a thickness setting by pressing and a hardening by heating of many segment-type friction materials at one time. That is, the thermosetting adhesive is coated on each of the core metals 51 and each of corresponding groups of the segment pieces 52 is stuck to each surface of the core metal 51 so as to prepare half-finished products. Then, the half-finished products are pressed and heated at on time by the multistage molding die.

Specific examples of multistage molding dies are illustrated, as a related art, that have a structure as shown in FIGS. 7a to 7c and a structure as shown in FIGS. 8a and 8b. FIGS. 7a to 7c are explanatory drawings showing a structure of a multistage molding die according to a first specific example as a related art or a comparative example of the present invention. FIGS. 8a and 8b are explanatory drawings showing a structure of a multistage molding die according to a second specific example as a related art or a comparative example of the present invention. The first specific example of a multistage molding die is shown in FIGS. 7a to 7c. As shown in FIG. 7a, a multistage molding die 55 is composed of a plurality of molding dies 56. Lifting bolts 58 are fixed on opposite side surfaces of each of the molding dies 56. Links 59 are engaged with these lifting bolts 58 respectively at each of the side surfaces of the molding die 56.

As shown in FIG. 7b, in case of opening each of the molding dies 56, upper ends of the links 59 are pulled up in series or in sequence by a not-shown pull-up mechanism. As shown in FIG. 7c, in case of closing each of the molding dies 56 for pressing/thickness setting and heating/hardening of the segment-type friction material 50, the not-shown pull-up mechanism is released. Then, each of the molding dies 56 is pressed and closely contacted or clamped with each other by a not-shown pressing mechanism. In the first specific example of the multistage molding die described above, a weigh of each of the molding dies 56 is supported only by the lifting bolts 58. Accordingly, there is a problem that the lifting bolts 58 are susceptive to breakage.

The second specific example of a multistage molding die is shown in FIGS. 8a and 8b. As shown in FIG. 8a, a multistage molding die 60 is composed of a plurality of molding dies 61. Links 63 that are rotatably opened and closed are fixed on opposite side surfaces of each of the molding dies 61. Each of the molding dies 61 is slidable up and down along a guide post 62. In case of opening each of opening each of the molding dies 61, upper ends of the links 63 are pulled up in series or in sequence by a not-shown pull-up mechanism. As shown in FIG. 8b, in case of closing each of the molding dies 61 for pressing/thickness setting and heating/hardening of the segment-type friction material 50, the not-shown pull-up mechanism is released. Then, each of the molding dies 61 is pressed and closely contacted or clamped with each other by a not-shown pressing mechanism.

As mentioned above, a plurality of segment-type wet friction materials 50 are processed at one time such that all the thermosetting adhesives are set or hardened so as to fixedly stick all the segment pieces on all the core metals. Thus, the multistage molding die improves the manufacturing efficiency of the molding step that requires a fixed time period (30 seconds to 90 seconds) in order to heat and set the thermosetting adhesive.

However, a weight per unit or a weight of each of the molding dies 56, 61 is about 40 kg to 70 kg. A hydraulic cylinder as the pull-up mechanism and the pressing mechanism is usually operated at a speed of 50 mm/s to 100 mm/s. An operation at a higher speed causes a noise (80 dB or more) due to an impact at the time of mold clamping. It also causes a displacement of the segment-type wet friction material 50 due to vibration at the time of mold clamping. Therefore, such speeding up is impossible. Moreover, an increase of a number of the molding dies 56, 61 or stages of the multistage molding die 55, 60 also has a limitation inherently in view of its maintainability and workability. As a result, there is still a problem that the molding step remains a rate-determining step.

BRIEF SUMMARY OF THE INVENTION

In view of the above, an object of the present invention is to provide a molding apparatus of a wet friction material that solves a problem of an impact noise or vibration displacement of a segment-type wet friction material, while making more than double a working speed in a molding step as a rate-determining step of a manufacturing process of a wet friction material so as to shorten a manufacturing time to a large degree.

According to a first aspect of the invention, there is provided a molding apparatus of a wet friction material for sticking one of a ring-shaped friction material substrate or a plurality of segment pieces cut out of a friction material substrate on one or both surfaces of a core metal of a flat ring shape. In the molding apparatus, at least three molding dies are vertically piled up on each other so as to move up and down to each other. A lowermost one of the molding dies includes an upper surface provided with a mounting surface for mounting a half-product of the wet friction material. A middle one (one or more in number) of the molding dies includes the lower surface provided with the mounting surface and an upper surface provided with a pressing surface for pressing an entire surface of the half-product of the wet friction material mounted on the mounting surface of an underside molding die. An uppermost one of the molding dies includes the lower surface provided with the lower surface provided with the pressing surface. The half-product having the ring-shaped friction material substrate or the plurality of segment pieces stuck on one or both surfaces coated with a thermosetting adhesive of the core metal. Heating mechanisms are provided on the molding dies, respectively, for heating the mounting surface and/or the pressing surface. At least one pantograph-type open-close link mechanism is provided on side surfaces of the molding dies so as to move up and down the molding dies near to each other and apart from each other all at once in a synchronous manner.

Thus, the molding apparatus according to the first aspect of the invention is able to increase a working speed in a molding step as a rate-determining step of a manufacturing process of a wet friction material more than twice of a working speed of a conventional apparatus, thereby shortening a manufacturing time very much.

Specifically, the inventive molding apparatus of the wet friction material has the pantograph-type open-close link mechanism that has a function totally different from that of an open-close mechanism (link mechanism) of a multistage molding die according to the related art. Thus, each of the molding dies does not slides sequentially or one by one but all the molding dies slide at a time in a synchronous manner. Consequently, even if a sliding speed of each of the molding die is slower than a moving speed in the related art, it takes much less time required for completing open/close action of all the molding dies.

For example, suppose that the molding dies are provided in fifteen stages and a distance between an upper surface (mounting surface side) and a lower surface (pressing surface side) is 50 mm when each of the molding dies is opened. Then, in case of the apparatus in the related art, it takes 0.5 second for closing one stage of the molding die when sliding the molding dies at a rate of 100 mm/sec one by one. Therefore, it takes 7.5 seconds to close all the molding dies (0.5 sec*15 (stages)=7.5 sec). Thus, it takes 15 seconds as a double of that time period for completing the opening and closing action. In contrast, with the pantograph-type open-close ling mechanism according to the invention, all the molding dies are opened and closed at the same time in a synchronous manner. Consequently, when synchronously sliding all the molding dies at a speed of 200 mm/sec, it takes only 3.75 seconds to close all the molding dies (50 mm*15/ 299 mm=3.75 sec). It takes 7.5 seconds as a double of that time period for completing the opening and closing action. That is, the time period is decreased to a half of the related art.

Moreover, the time period for sliding each stage is 13.3 mm/sec (200 m/sec/15=13.3 mm/sec). Thus, it is sufficient to move the molding dies at a sliding speed much lower than that of the related art. Consequently, there is not any possibility to cause a problem such as a noise due to an impact at the time of clamping or a displacement of a segment-type wet friction material due to vibration. Furthermore, it is possible to heighten the sliding speed of the pantograph-type open-close link mechanism more than 200 mm/sec.

Thus, the molding apparatus of the wet friction material solves a problem of an impact noise or vibration displacement of a segment-type wet friction material, while making more than double a working speed in a molding step as a rate-determining step of a manufacturing process of a wet friction material so as to shorten a manufacturing time to a large degree.

A molding apparatus of a wet friction material may further comprise at least one guide post vertically passing through a part except the mounting surface of the molding dies so as to guide a vertical sliding movement of the molding dies.

Thereby, the molding dies slide up and down along the guide post, so that the opening and closing action of the molding dies are performed more smoothly.

A molding apparatus of a wet friction material may further comprise at least one slide guide vertically extending corresponding to the pantograph-type open-close link mechanism so as to guide a vertical sliding movement of the pantograph-type open-close link mechanism.

Thereby, an operation of the pantograph-type open-close link mechanism becomes smoother, so that the molding dies are surely opened and closed in a short amount of time.

In a more preferable molding apparatus of a wet friction material, the pantograph-type open-close link mechanism is composed of a plurality number of pairs of crossed link bars corresponding to a number of stages of the molding dies, each pair of the crossed link bars having a pair of projections formed on opposite ends thereof. Each of the molding dies has a pair of horizontally oblong openings formed on opposite side surfaces thereof at locations corresponding to the protrusions of each pair of the crossed link bars of the pantograph-type open-close link mechanism. The pair of the protrusions of each pair of the crossed link bars is fitted in the pair of the openings, respectively, so as to slide along the length of the openings so that the protrusions of the crossed link bars slide horizontally in the openings of the molding dies thereby permitting extension and contraction of the pantograph-type open-close link mechanism for moving up and down the molding dies all at once in the synchronous manner.

In a more preferred molding apparatus of a wet friction material, the openings of the uppermost and lowermost molding dies have a horizontally oblong shape with a lower side closed and the openings of the middle molding die have an oblong shape with a lower side opened downward.

In a more preferred molding apparatus of a wet friction material, a horizontal length of the opening of the molding die is set such that the protrusions of the crossed link bars come at an inner end of the opening at the time of opening the molding dies, while coming at an outer end of the opening at the time of clamping the molding dies.

In a more preferred molding apparatus of a wet friction material, a pair of the pantograph-type open-close link mechanisms is provided on opposite sides of the molding dies, respectively. Each of the pantograph-type open-close link mechanism is composed of a plurality number of pairs of crossed link bars corresponding to a number of stages of the molding dies. Each pair of the crossed link bars has two pairs of opposite ends coupled to side surfaces of adjacent two of the molding dies. A pair of guide posts vertically passes through opposite locations except the mounting surface of the molding dies so as to guide a vertical sliding movement of the molding dies. A pair of slide guides vertically extends corresponding to center joints of the crossed link bars of the pair of the pantograph-type open-close link mechanisms so as to guide a vertical sliding movement of the pantograph-type open-close link mechanisms, respectively.

In a more preferred molding apparatus of a wet friction material, the pair of the guide posts and the pair of the slide guides are aligned along a lateral center axis connecting the center joints of the pair of the pantograph-type open-close link mechanisms.

BRIEF DESCRIPTION OF THE SEVERAL VIEWS OF THE DRAWINGS

FIG. 7a illustrates a front view of the first specific example of the multistage molding die in an opened state. FIG. 7b illustrates a side view of the first specific example of the multistage molding die in the opened state. FIG. 7c illustrates a side view of the first specific example of the multistage molding die in a closed state.

FIGS. 8a and 8b are explanatory drawings showing a structure of a multistage molding die according to a second specific example as a related art or a comparative example of the present invention. FIG. 8a illustrates a side view of the second specific example of the multistage molding die in an opened state. FIG. 8b illustrates a side view of the second specific example of the multistage molding die in a closed state.

DETAILED DESCRIPTION OF THE INVENTION

A molding apparatus of a wet friction material according to a preferred embodiment of the invention is described hereunder referring to FIG. 1 to FIG. 5.

Figure 1:
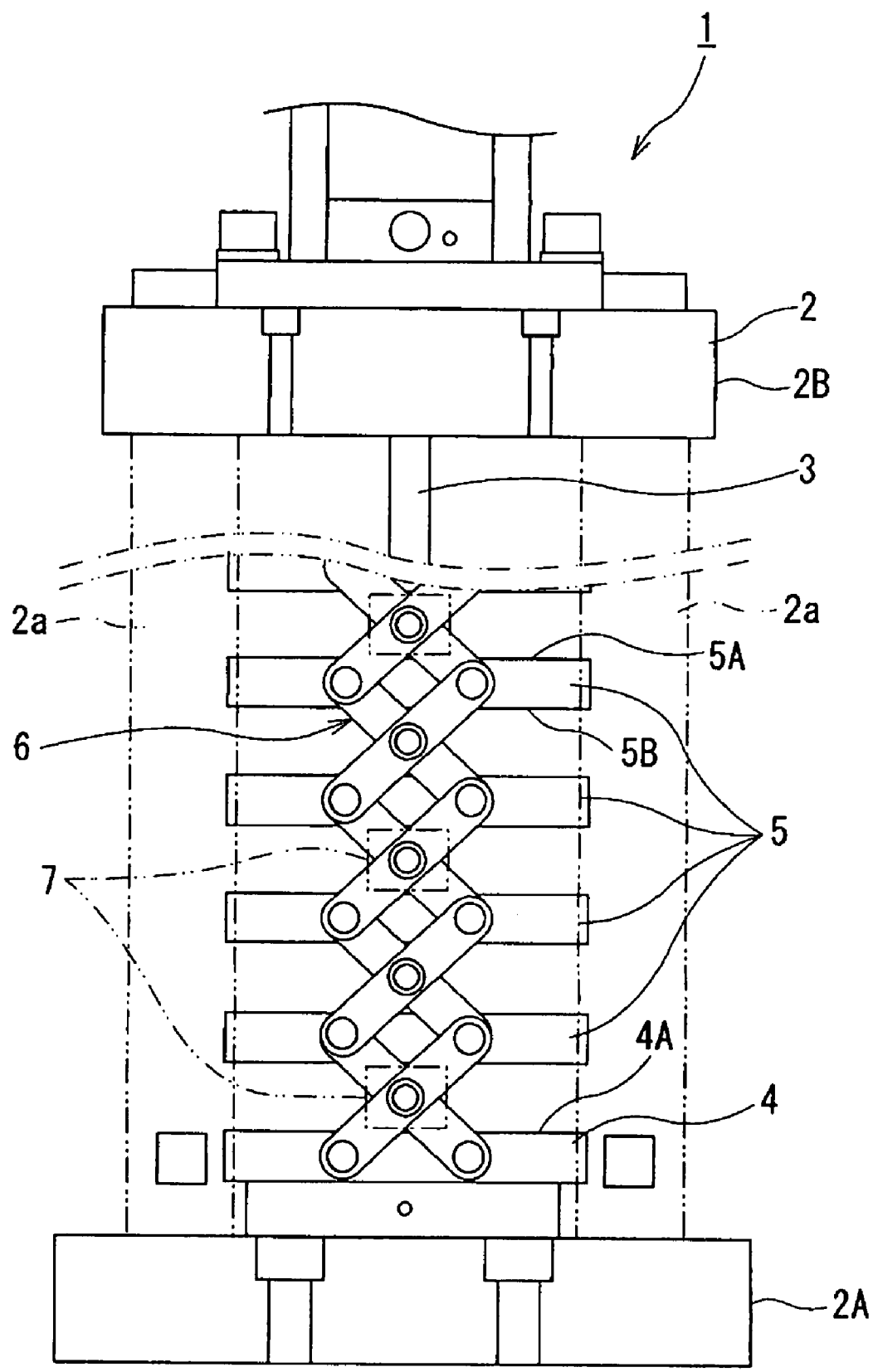
FIG. 1 is a schematic side view showing an overall structure of a molding apparatus of a wet friction material according to an embodiment of the invention.
Figure 2A:
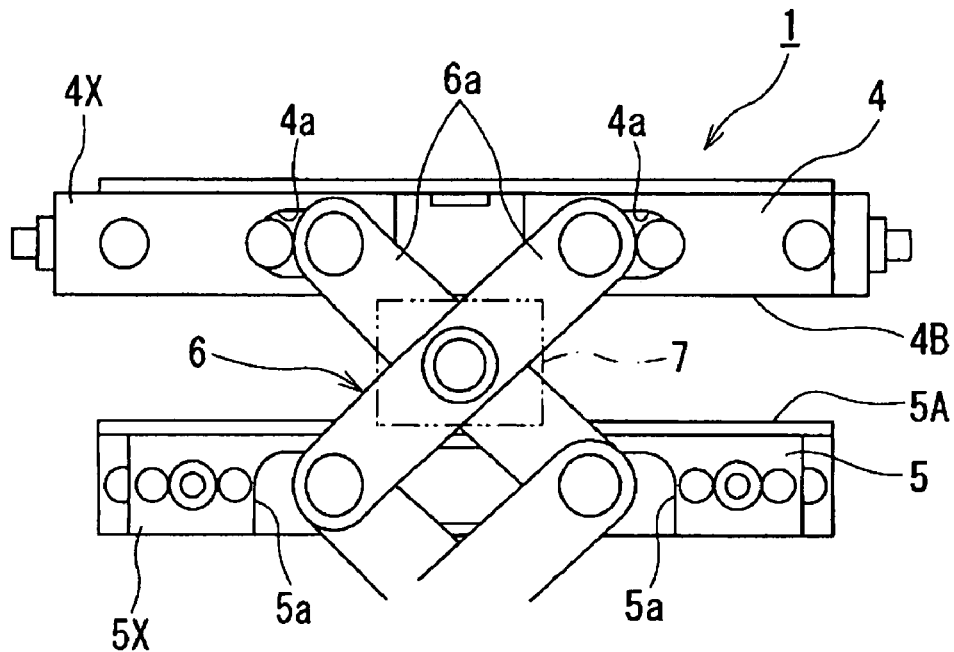
FIG. 2a is a partial side view showing an opened state of a pantograph-type open-close link mechanism of the molding apparatus of the wet friction material according to the embodiment of the invention.
Figure 2B:
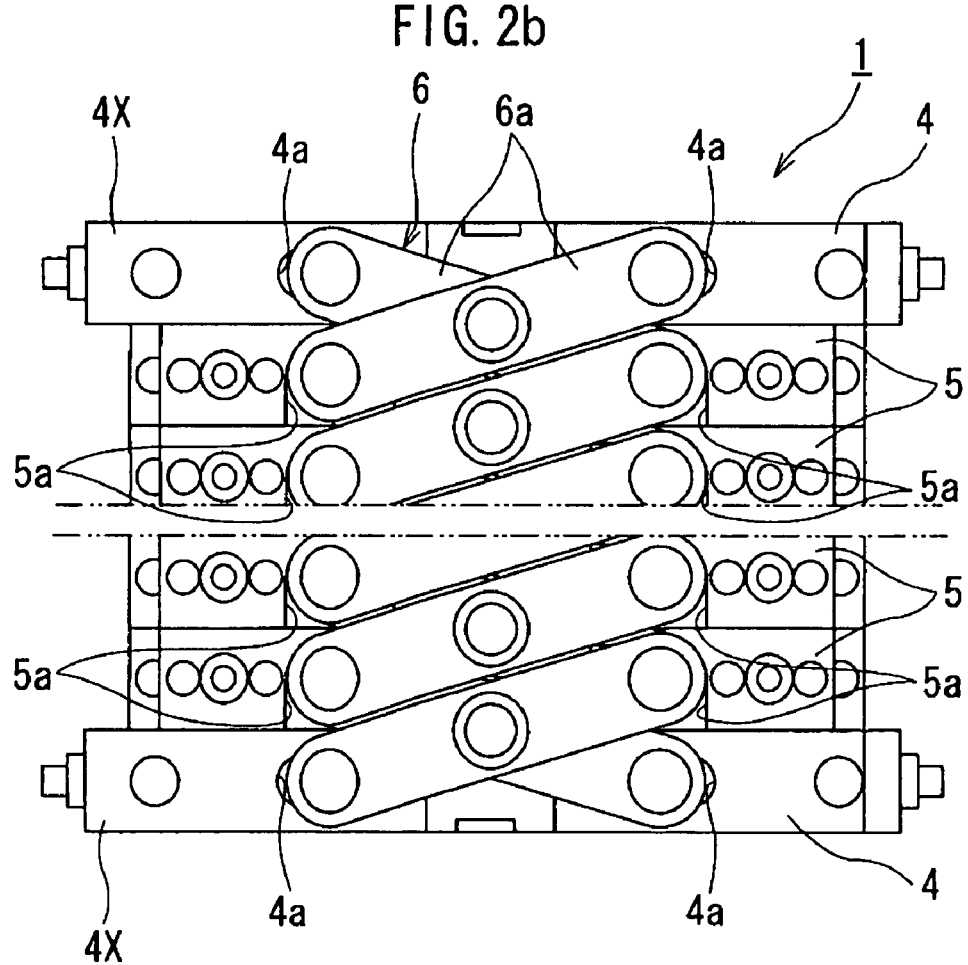
FIG. 2b is a partial side view showing a closed state of the pantograph-type open-close link mechanism.
Figure 3:
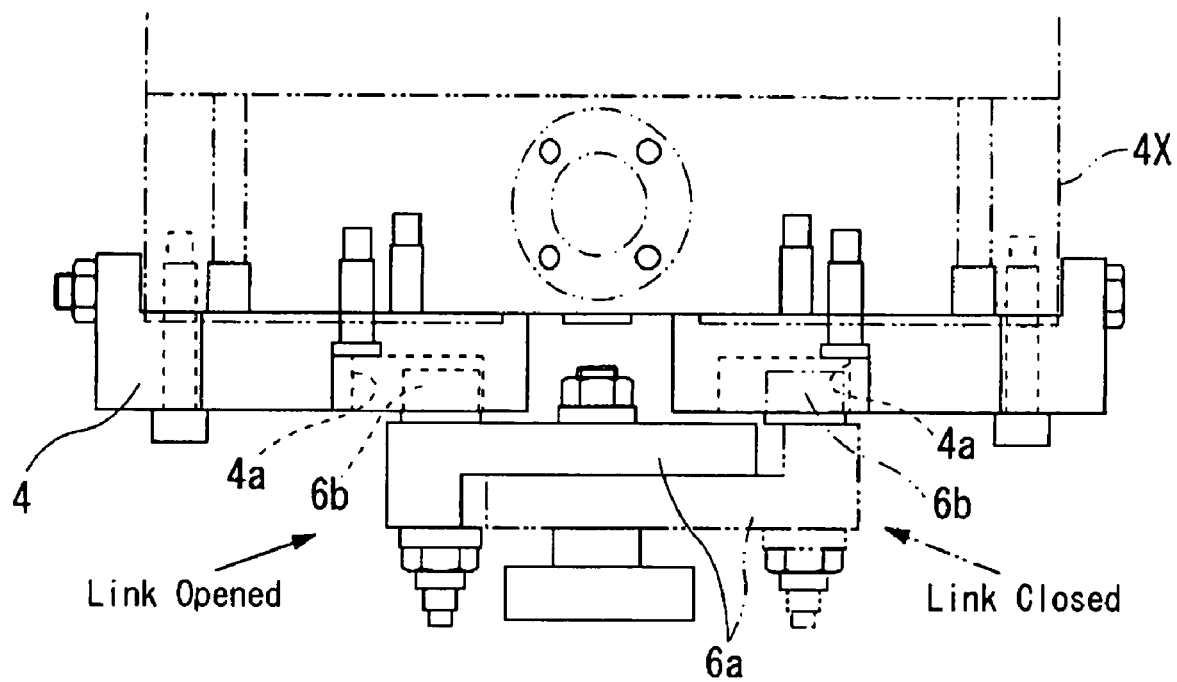
FIG. 3 is an explanatory drawing illustrating a top plan view of the pantograph-type open-close link mechanism in the molding apparatus of the wet friction material according to the embodiment of the invention.
Figure 4:
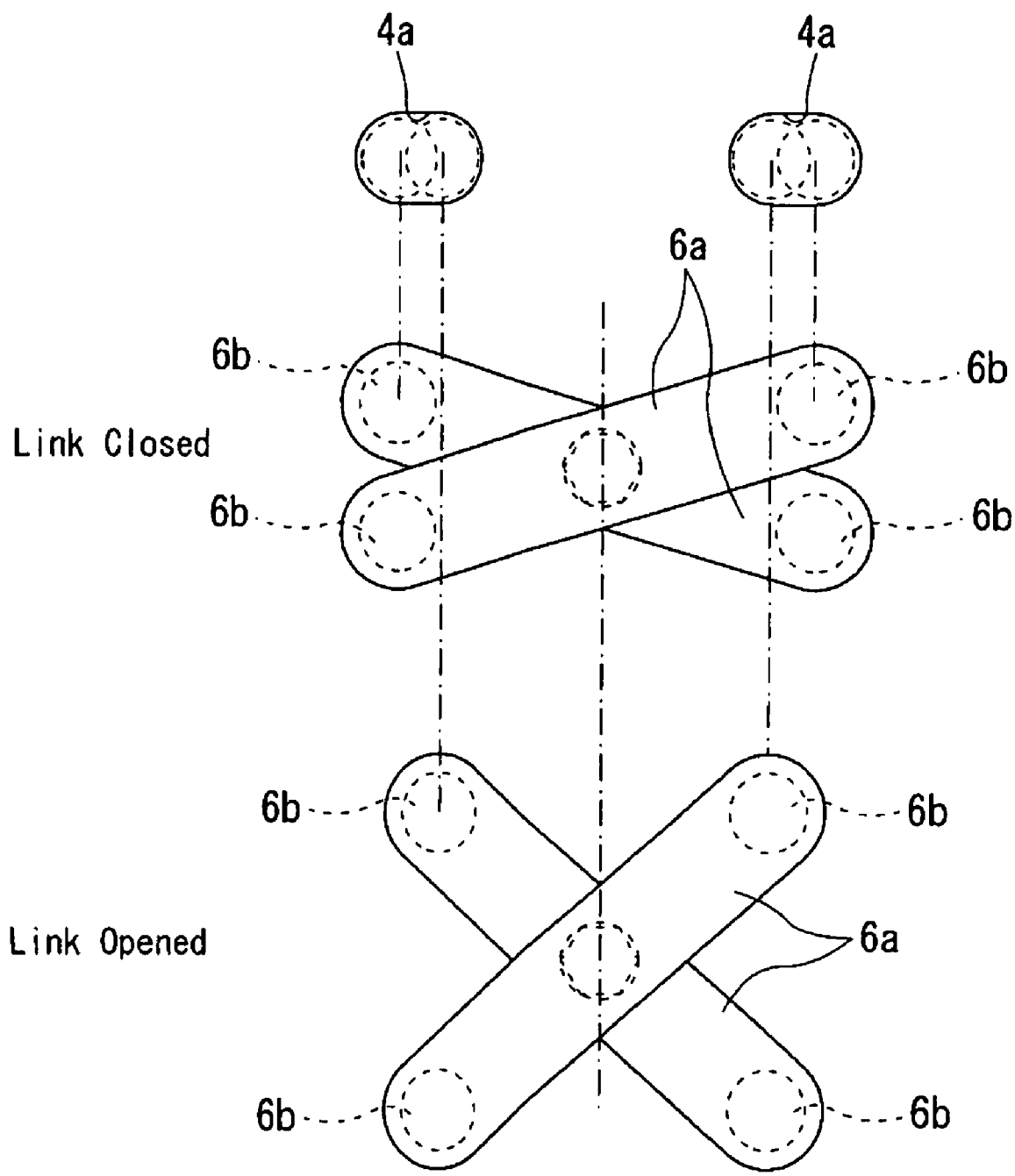
FIG. 4 is an explanatory drawing showing an opening operation and a closing operation of the pantograph-type open-close link mechanism.
Figure 5:
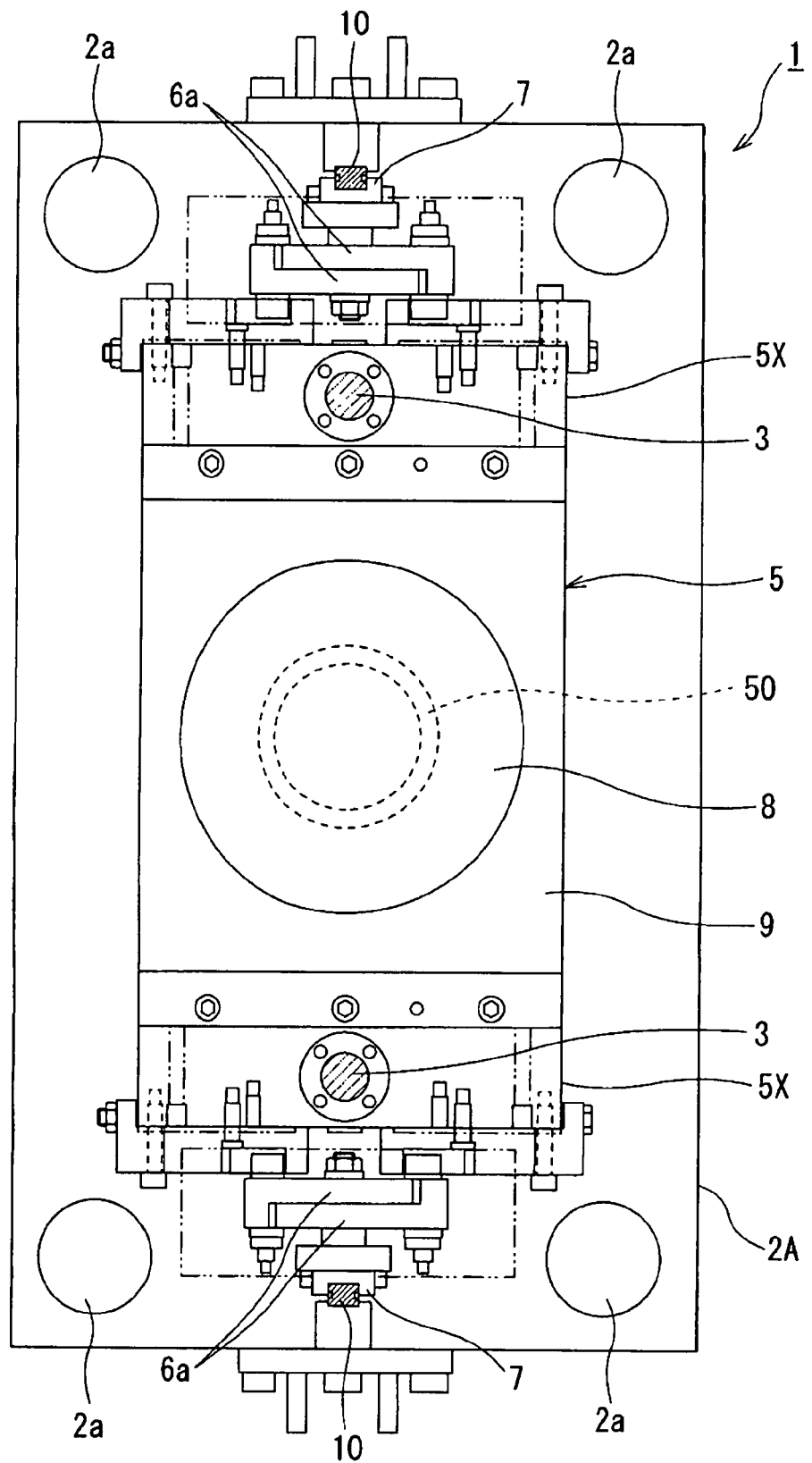
FIG. 5 is a plan view showing an upper surface of a molding die constituting the molding apparatus of the wet friction material according to the embodiment of the invention.
Figure 6A:
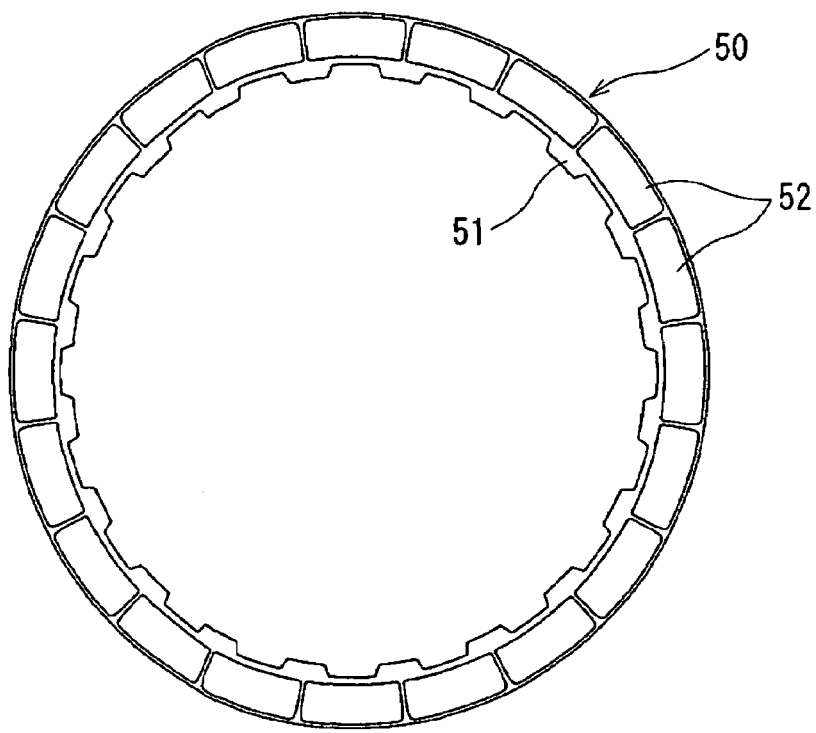
FIG. 6a is a plan view showing an overall structure of a segment-type wet friction material.
Figure 6B:
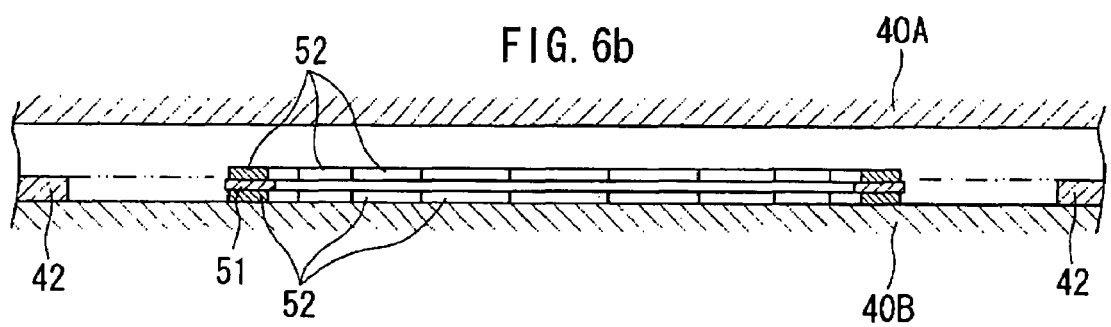
FIG. 6b is a cross-sectional view showing a step of a manufacturing process of a wet-type friction material in which segment pieces are joined by adhesion to a core metal.
Figure 6C:
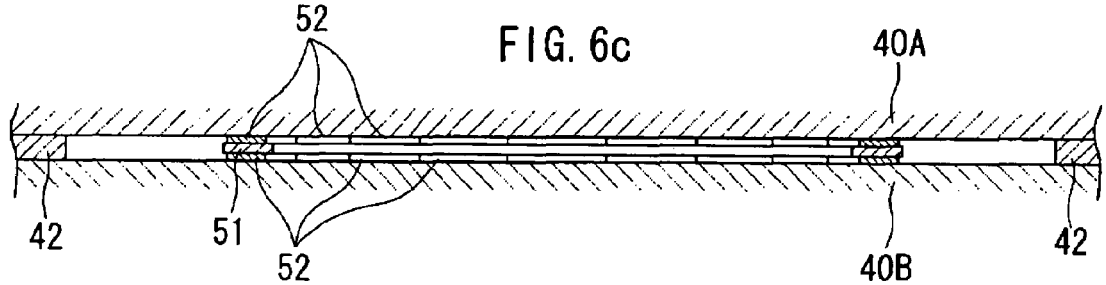
FIG. 6c is a cross-sectional view showing a next step in which the adhering segment pieces are pressed for thickness setting.
Figure 7A:
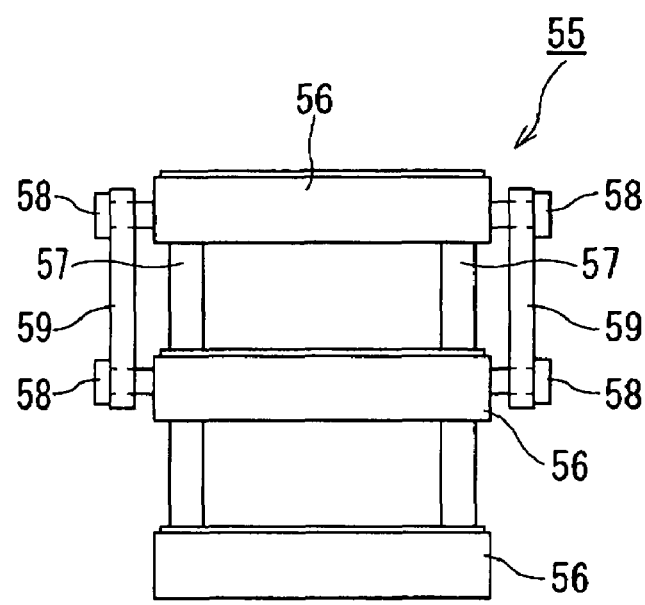
FIGS. 7a to 7c are explanatory drawings showing a structure of a multistage molding die according to a first specific example as a related art or a comparative example of the present invention.
Figure 7B:
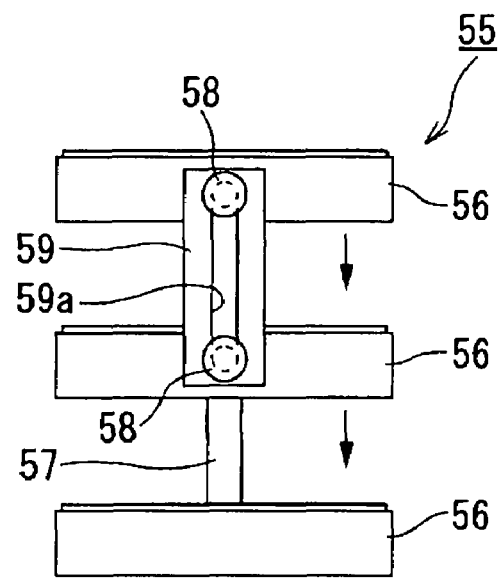
Figure 7B:
Figure 7C:
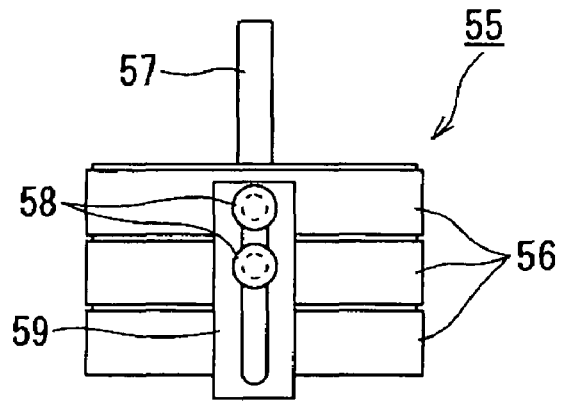

FIG. 1 is a schematic side view showing an overall structure of a molding apparatus of a wet friction material according to an embodiment of the invention. FIG. 2a is a partial side view showing an opened state of a pantograph-type open-close link mechanism of the molding apparatus of the wet friction material according to the embodiment of the invention. FIG. 2b is a partial side view showing a closed state of the pantograph-type open-close link mechanism. FIG. 3 is an explanatory drawing illustrating a top plan view of the pantograph-type open-close link mechanism in the molding apparatus of the wet friction material according to the embodiment of the invention. FIG. 4 is an explanatory drawing showing an opening operation and a closing operation of the pantograph-type open-close link mechanism. FIG. 5 is a plan view showing an upper surface of a molding die constituting the molding apparatus of the wet friction material according to the embodiment of the invention, while showing guide posts and sliders of the molding apparatus in a cross-section at a position where the corresponding molding die is located.

As shown in the side view of FIG. 1, a molding apparatus 1 of a wet friction material according to the present embodiment has a molding apparatus main body 2. The molding apparatus main body 2 has a base 2A and a top 2B vertically opposed to each other at a prescribed distance. Each of the base 2A and the top 2B may be a flat square plate or the like. As shown in FIG. 5, four corner posts 2a are vertically erected and interposed at between four corners of the base 2A and the top 2B, respectively, so as to fixedly support and keep apart the base 2A and the top 2B at the prescribed distance. The corner posts 2a are shown by an imaginary line in FIG. 1A. A pair of guide posts or guide pins 3 is vertically disposed between the base 2A and the top 2B. The guide posts 3 are located at right and left end portions of the molding apparatus main body 2, respectively, at middle positions between the corresponding corner posts 2. The guide posts 3 are positioned inside a space enclosed by the four corner posts 2a. Molding dies 4 and 5 are provided in fifteen stages (sixteen pieces) in total between the base 2A and the top 2B. The guide posts 3 slidably pass through all the molding dies 4 and 5 at middles of right and left end portions or end supports 4X and 5X of the molding dies 4 and 5, respectively. Thus, the molding dies 4 and 5 are able to move up and down along the guide posts 3, while guided by the guide posts 3.

A pair of pantograph-type open-close link mechanism 6 is attached to right and left side surfaces of the molding dies 4 and 5. The pantograph-type open-close link mechanism 6 is composed of a fixed number of crossed link bars 6a. Each of the crossed link bars 6a is made of two link bars 6a as a revolute pair so as to be crossed and joined rotatably at the center with each other. Fifteen pairs of the crossed link bars 6a are provided corresponding to the number of the stages of the molding dies 4 and 5. The fifteen pairs of the crossed link bars 6a have their ends coupled rotatably with each other so as to form the pantograph-type open-close link mechanism 6. Thus, the pantograph-type open-close link mechanism 6 expands and contracts according to an external force applied thereto in the same manner as a common pantograph mechanism. That is, in an expanding action, all the pairs of the crossed link bars 6a gradually change or increase their cross angle at a same rate so as to enlarge their height uniformly and open at a same speed. On the other hand, in a contracting action, all the pairs of the crossed link bars 6a gradually change or decrease their cross angle at a same rate so as to lessen their height uniformly and close at a same speed.

Each pair of the crossed link bars 6a has their opposite ends (four ends in total) fitted in the end supports 4X, 5X of the vertically adjacent molding dies 4, 5 so as to move or slide horizontally along the side surfaces of the end supports. That is, each pair of the crossed link bars 6a has two upper ends fitted in an upper one of the adjacent molding dies 4, 5 in a horizontally slidable manner, while having two lower ends movably fitted in a lower one in a horizontally slidable manner. Thus, each pair of the crossed link bars 6a connect or couple the adjacent two molding dies 4, 5, while supporting the molding dies 4, 5 in a vertical direction. In other words, the molding dies 4 and 5 are piled or built up on each other via the pantograph-type open-close link mechanism 6. Thereby, when the pantograph-type open-close link mechanism 6 is expanded and contracted by an actuator, the molding dies 4 and 5 moves up and down accordingly. That is, the molding dies 4 and 5 vertically move apart from each other for mold opening when the link mechanism 6 is expanded (see FIG. 2a), while vertically coming near and being contacted with each other for mold clamping (see FIG. 2b).

Referring to FIG. 5, a pair of slide guides 10 is fixed between the base 2A and the top 2B of the molding apparatus main body 2 so as to extend in the vertical direction, though not shown in FIG. 1. The slide guides 10 are disposed in front or outside of the open-close link mechanisms 6, respectively, so as to guide vertical slide of the link mechanisms 6. Specifically, the slide guide 10 is erected at a lateral center of the link mechanism 6 so as to face center joints of the crossed link bars 6a. Sliders 7 are fixed on the link mechanism 6 at crossing portions of every two pairs of the crossed link bars 6a as shown by an imaginary line in FIG. 1. Thus, eight sliders 7 are provided in total corresponding to fifteen pairs of the crossed link bars 6a. Each of the sliders 7 has a guide groove formed at an inside and linearly and vertically extending. The slide guide 10 extends at least from a position corresponding to the lowermost slider 7 to a position corresponding to the uppermost slider 7. The sliders 7 are fitted via the guide groove onto the slide guide 10 so as to slide vertically along the slide guide 10. Thus, the vertical movement of the open-close link mechanism 6 is guided by engagement of the sliders 7 and the slide guides 10. Thereby, the link mechanism 6 moves or slides up and down more smoothly.

As shown in FIG. 5, the slide guides 10 are located in parallel to the guide posts 3, respectively, so that the two guide posts 3 and the two slide guides 10 are aligned along nearly a lateral center line of the molding apparatus main body 2 or the base 2A and the top 2B. Such positional relationship between the guide posts 3 and the slide guides 10 facilitates a smooth vertical movement of the molding dies 4 and 5 and the link mechanisms 6 as a whole. Still, the guide posts 3 and the slide guides 10 may have any configuration including positional relationship as long as the guide posts 3 guide the molding dies 4 and 5, while the slide guides 10 guiding the link mechanism 6. The slider 7 is a rectangular block shape and the guide groove of the slider 7 has the same square cross-section as the slide guide 10. However, the slider 7 and the guide groove or the slide guide 10 may have any structure as long as the slider 7 is guided along the slide guide 10. The lowermost molding die 4 has an upper surface 4A (see FIG. 1). The uppermost molding die 4 has a lower surface 4B (see FIG. 2a). Each of the middle molding dies 5 has an upper surface 5A and a lower surface 5B. The molding die 5 has a mounting surface 8 formed at a longitudinal major center part of the upper surface 5A. The end supports 5X are provided at the opposite ends of mounting surface 8. A shim 9 is placed on the mounting surface 8. The shim 9 has a rectangular outline equal to an outline of the mounting surface 8. The shim 9 has a center part bored in a round shape so as to define an accommodating space for a semi-finished friction material. Though not shown, the lowermost molding die 4 also has the mounting surface 8 and the shim 9 on the upper surface 4A. The molding die 5 has a pressing surface formed on the lower surface 5B at a location corresponding to the mounting surface 8 of the downside molding die 5. Though not shown, the uppermost molding die 4 also has the pressing surface 8 on the lower surface 4B corresponding to the mounting surface 8 of the downside molding die 5. Though not shown, the uppermost molding die 4 also has the pressing surface 8 on the lower surface 4B corresponding to the mounting surface 8 of the downside molding die 5.

Next, the pantograph-type open-close link mechanism 6 is described more in detail together with its opening and closing operation referring to FIGS. 2a and 2b to FIG. 4. As shown in FIG. 2a and FIG. 2b, in the molding apparatus 1 of the wet friction material according to the present embodiment, the uppermost molding die 4 and the lowermost molding die 4 have a slightly different structure from the other fourteen molding dies 5 arranged therebetween. Specifically, the uppermost molding die 4 has a pair of dents 4*a* with substantially an oval or track outline (see FIG. 4) at each of the right and left side surfaces of the end supports 4X. In the same manner, the lowermost molding die 4 has a pair of dents 4*a* with substantially an oval or track outline at each of the right and left side surfaces of the end supports 4X. The dents 4*a* are formed at right and left sides of each side surface at a same distance from the longitudinal center or the longitudinal ends of the side surface. That is, the dents 4*a* are located symmetrically to a longitudinal center of the side surface of the molding die 4. The dents 4*a* have the same shape or outline and a fixed length of a major axis. A width of a minor axis of the dent 4*a* is also fixed. On the other hand, each of the other moldings dies 5 has a pair of cutouts or notches 5*a* at each of the right and left side surfaces of the end supports 5X. The notches 5*a* are formed at right and left sides of each side surface at a same distance from the longitudinal center or the longitudinal ends of the side surface, too. That is, the notches 5*a* are also located symmetrically to a longitudinal center of the side surface of the molding die 5 at positions corresponding to the positions of the dents 4*a*. The notches 5*a* have the same shape or outline with a fixed length corresponding to or same as the length of the dents 4*a*. The notches 5*a* has its lower side opened from the lower edge of the side surface of the end support 5X of the molding die 5, while the dents 4*a* of the molding die 4 are closed lower side. Upper sides of the dent 4*a* and the upper sides of the notch 5*a* are located substantially at the same distance from the upper sides of the molding dies 4 and 5, respectively. Each of the uppermost and lowermost molding dies 4 has a pair of shafts or protruded portions at the longitudinal ends of the both end supports 4X, respectively. Thus, the shaft may be used to connect a leading end of a hydraulic cylinder as an actuator to move up and down the uppermost molding die 4 so that the open-close link mechanism 6 move the middle molding dies 5 synchronously, for example.

As shown in FIG. 3, each pair of the crossed link bars 6*a* constituting the open-close link mechanism 6 has a pair of protrusions 6*b* formed at opposite ends. The protrusions 6*b* are protruded toward the side surface of the end support 4X, 5X of the corresponding molding die 4, 5. As shown in FIGS. 2*a* and 2*b*, the protrusions 6*b* are fitted in the corresponding dents 4*a* of the molding die 4 or the corresponding notches 5*a* of the molding die 5, respectively. The protrusion 6*b* has a diameter substantially the same as the width of the dent 4*a* so as to slide along the length of the dent 4*a*. The length of the dent 4*a* and the notch 5*a* defines or limits a slide movement of the protrusions 6*b* so that the vertical movement (up and down distance) of the pantograph-type open-close link mechanism 6 is defined or limited by the length of the dent 4*a* and notch 5*a*. The dents 4*a* of the uppermost and lowermost molding dies 4 are closed opening or hole so that the protrusions 6*b* are prevented or blocked from getting out of the dents 4*a*. Moreover, the closed dents 4*a* enable the uppermost and lowermost molding dies 4 to be urged up and down by the actuator so as to press the middle molding dies 5 therebetween. On the other hand, the notches of the middle molding dies 5*a* are opened at their lower sides. Thus, the molding dies 5 may be easily attached to the link mechanism 6 by placing the notches 5*a* on the protrusion 6*b* from an upper side after the uppermost and lowermost molding dies 4 are attached to the link mechanism 6. Moreover, it may be possible to move upward and detach the middle molding dies 5 even after they are attached. In any way, the uppermost and lowermost molding dies 4 are retrained from detachment by the closed dents 4*a* and press the molding dies 5 therebetween. Consequently, the middle molding dies 5 perform their heat press action as expected when moved up and down by the link mechanism 6.

FIG. 2*a* shows an extended or stretched state of the pantograph-type link open-close link mechanism 6, wherein the fifteen stages (sixteen pieces) of the molding dies 4 and 5 are opened. In this state, the protrusions 6*b* at the opposite ends of the crossed ling bars 6*a* are slid to inner ends of the oblong dents 4*a* and the notches 5*a*, respectively. In contrast, FIG. 2*b* shows a contracted or folded state of the pantograph-type link open-close link mechanism 6, wherein the fifteen stages (sixteen pieces) of the molding dies 4 and 5 are closed and clamped. In this state, the protrusions 6*b* at the opposite ends of the crossed ling bars 6*a* are slid to outer ends of the oblong dents 4*a* and the notches 5*a*, respectively.

FIG. 3 illustrates a top plan of the extended and contracted states of the link mechanism 6. As shown by a solid line in FIG. 3, the protrusion 6*b* of the link bar 6 is located at the inner end inside the oval dent 4*a* at the time of opening the molding dies. On the other hand, as shown by an imaginary line in FIG. 3, the protrusion 6*b* of the link bar 6 is located at the outer end inside the oval dent 4*a* at the time of closing and clamping the molding dies.

The operation of the link mechanism 6 is described more in detail referring to FIG. 4. At the time of clamping, the link bars 6*a* are in the contracted or folded state as shown by an upper side view in FIG. 4. Then, the protrusions 6*b* provided at the opposite ends of the link bars 6*a* are located at the outermost position inside the oval dent 4*a*. At the time of opening, the link bars 6*a* are in the extended or stretched state as shown by a lower side view in FIG. 4. Then, the protrusions 6*b* provided at the opposite ends of the link bars 6*a* are located at the innermost position inside the oval dent 4*a*.

As described above, the pantograph-type open-close link mechanism is extended and contracted to lift up and down the molding dies 4 and 5. A driving force for the operation is given by a not-shown hydraulic cylinder, which is operatively coupled to the link mechanism. The hydraulic cylinder may be coupled directly to the link mechanism 6 or indirectly thereto via the aforementioned shafts shown in FIGS. 2*a* and 2*b*, for example. Next, the operation of the molding apparatus of the present embodiment is compared with the apparatuses or systems shown in FIG. 7 and FIG. 8 as the related art. Suppose that the molding dies are provided in fifteen stages and a distance between an upper surface (mounting surface side) and a lower surface (pressing surface side) is 50 mm when each of the molding dies is opened. Then, in case of the apparatus shown FIG. 7 and FIG. 8, it takes 0.5 second for closing one stage of the molding die when sliding the molding dies at a rate of 100 mm/sec one by one. Therefore, it takes 7.5 seconds to close all the molding dies (0.5 sec*15 (stages)=7.5 sec). Thus, it takes 15 seconds as a double of that time period for completing the opening and closing action.

In contrast, all the molding dies 4 and 5 are opened and closed at the same time in a synchronous manner by the pantograph-type open-close link mechanism 6 in the present embodiment. Consequently, when synchronously sliding all the molding dies 4 and 5 at a speed of 200 mm/sec, it takes only 3.75 seconds to close all the molding dies 4 and 5 (50 mm*15/299 mm=3.75 sec). It takes 7.5 seconds as a double of that time period for completing the opening and closing action. That is, the time period is decreased to a half of the related art. Moreover, the time period for sliding each stage is 13.3 mm/sec (200 m/sec/15=13.3 mm/sec). Thus, it is sufficient to move the molding dies 4 and 5 at a sliding speed much lower than that of the related art. Consequently, there is not any possibility to cause a problem such as a noise due to an impact at the time of clamping or a displacement of a segment-type wet friction material 50 due to vibration. Furthermore, it is possible to heighten the sliding speed of the pantograph-type open-close link mechanism 6 more than 200 mm/sec.

In addition, as shown in FIG. 5, the pair of the guide posts 3 vertically goes through a location except the mounting surface 8 of the molding dies 4 and 5 including a portion that mounts the shim 9 with a rectangular outline and a center part hollowed or bored in a round shape corresponding to the mounting surface 8 so that the molding dies 4 and 5 are made slidable along the guide posts 3. Thereby, the plurality of the molding dies 4 and 5 slide up and down along the guide posts 3, while keeping the upper and lower surfaces 4A, 4B, 5A, 5B horizontal. Consequently, it is possible to open and close the plurality of the molding dies 4 and 5 more smoothly.

As shown in FIG. 5, each of (fifteen) half-products of the wet friction materials 50 is mounted on the mounting surface 8 at the center round bore surrounded by the shim 9 when the molding dies 4 and 5 are opened. The half-product has twenty segment pieces 52 stuck by adhesion on opposite surfaces of the core metal 51. Then, the pantograph-type open-close link mechanism 6 is contracted at high speed by a driving force of the aforementioned hydraulic cylinder. Thereby, the half-products are pressed and heated between the upper surfaces 4A, 5A and the lower surfaces 4B, 5B of the plurality of the molding dies 4 and 5, respectively. Consequently, the half-product is compressed in accordance with a thickness of the shim 9 so as to set its thickness. Then, when an adhesive on the core metal 51 is heated and set, so that the twenty segment pieces is fixed on each of the opposite surfaces of the core metal 51. Thus, (fifteen) wet friction materials 51 are manufactured as final products at once.

Moreover, as shown in FIG. 5, the pair of the slide guides 10 is provided near the pantograph-type open-close link mechanism 6 and vertically extended so as to guide the vertically sliding movement of the link mechanism 6. As described above, the sliders 7 secured on the link mechanism 6 are fitted via the guide groove to the slide guide 10. Thus, the sliders 7 vertically slide along the slide guide 10. Consequently, the operation of the pantograph-type open-close link mechanism 6 is made smoother. As a result, even if the sliding speed of the link mechanism 6 is increased to a large degree, the opening/closing action of the plurality of the molding dies 4 and 5 is surely performed in a small amount of time.

As described above, the molding apparatus 1 of the wet friction material according to the present embodiment solves the problem of the impact noise or vibration displacement of the segment-type wet friction material 50, while making more than double the working speed in the molding step as the rate-determining step of the manufacturing process of the wet friction material so as to shorten the manufacturing time to a large degree.

Specifically, if the sliding rate of the pantograph-type open-close link mechanism 6 is set at 200 mm/sec, the working speed becomes twice as high as the related art in the molding step. As a result, the overall production time for all the manufacturing steps for the wet friction material 50 is lessened to three fourth of the related art. The sliding rate of 200 mm/sec means a sliding speed of 13.3 mm/sec per one stage of the molding die as mentioned above, that is about seven times less than the sliding speed (100 m/sec) of each stage of the molding dies in the related art. In other words, since the pantograph-type open-close link mechanism 6 enables the synchronous movement of all the molding dies 4 and 5, the sliding speed can be lessened very much, while increasing the working speed.

In the molding apparatus 1 of the wet friction material according to the present embodiment, the sliding rate of the pantograph-type open-close link mechanism 6 is set at 200 mm/sec. However, the sliding speed is not limited thereto and may be changed according to a weight of the molding dies 4 and 5 and so on. The sliding speed may be set higher or lower than 200 mm/sec.

The invention is not limited to the present embodiment in constructions, components, assembling parts, shapes, materials, sizes, numbers, connecting relations and so on of the other parts of the molding apparatus of the wet friction material.

The preferred embodiments described herein are illustrative and not restrictive, the scope of the invention being indicated in the appended claims and all variations which come within the meaning of the claims are intended to be embraced therein.

The invention claimed is:

1. A molding apparatus of a wet friction material for sticking one of a ring-shaped friction material substrate or a plurality of segment pieces cut out of a friction material substrate on one or both surfaces of a core metal of a flat ring shape, comprising:

at least three molding dies vertically piled up on each other so as to move up and down to each other, a lowermost one of the molding dies including an upper surface provided with a mounting surface for mounting a half-product of the wet friction material, a middle one of the molding dies including the lower surface provided with the mounting surface and an upper surface provided with a pressing surface for pressing an entire surface of the half-product of the wet friction material mounted on the mounting surface of an underside molding die, an uppermost one of the molding dies including the lower surface provided with the lower surface provided with the pressing surface, the half-product having the ring-shaped friction material substrate or the plurality of segment pieces stuck on one or both surfaces coated with a thermosetting adhesive of the core metal;

heating mechanisms provided on the molding dies, respectively, for heating the mounting surface and/or the pressing surface; and a pantograph-type open-close link mechanism provided on side surfaces of the molding dies so as to move up and down the molding dies near to each other and apart from each other all at once in a synchronous manner, the pantograph-type open-close link mechanism being composed of a plural pairs of crossed link bars corresponding to a number of stages of the molding dies, each pair of the crossed link bars being rotatably joined with each other at a center of the cross linked bars, the pairs of the crossed link bars having ends rotatably coupled with each other to form the pantograph-type open-close link mechanism, and each pair of the crossed link bars having a pair of protrusions formed at opposite ends of the cross linked bars;

each of the molding dies comprising a pair of horizontally oblong openings on opposite side surfaces of the molding die at locations corresponding to the protrusions of each pair of the crossed link bars of the pantograph-type open-close link mechanism, the pair of the protrusions of each pair of the crossed link bars being fitted in the pair of the openings, respectively, to slide along a length of the openings, thereby permitting extension and contraction of the pantograph-type open-close link mechanism for moving up and down the molding dies all at once in the synchronous manner;

at least one of the uppermost molding die and the lowermost molding die being provided with a pair of dents constituting the openings, each of the dents having substantially an oval outline with a horizontally oblong shape and a closed lower side; and the protrusions of the crossed link bars corresponding to the dents of the molding die are fitted in the dents of the molding die, respectively, in a manner preventing the protrusions from moving out of the dents of the molding die.

2. A molding apparatus of a wet friction material according to claim 1, further comprising at least one guide post vertically passing through a part except the mounting surface of the molding dies so as to guide a vertical sliding movement of the molding dies.

3. A molding apparatus of a wet friction material according to claim 1, in which the uppermost molding die and the lowermost molding die each have a pair of dents as the openings, respectively, and the openings of the middle molding die have a horizontally oblong shape with a lower side opened downward.

4. A molding apparatus of a wet friction material according to claim 1, in which a horizontal length of the opening of the molding die is set such that the protrusions of the crossed link bars come at an inner end of the opening at the time of opening the molding dies, while coming at an outer end of the opening at the time of clamping the molding dies.

5. A molding apparatus of a wet friction material according to claim 2, in which:

the pantograph-type open-close link mechanisms is provided on each of opposite sides of the molding dies, so that the molding apparatus includes a pair of pantograph-type open-close link mechanisms;

the guide post is provided on each of the opposite sides of the molding dies so that the molding apparatus includes a pair of guide posts, and the slide guide is provided on each of the opposite sides of the molding dies so that the molding apparatus includes a pair of slide guides.

6. A molding apparatus of a wet friction material according to claim 5, in which the pair of the guide posts and the pair of the slide guides are aligned along a lateral center axis connecting the center joints of the pair of the pantograph-type open-close link mechanisms.

7. A molding apparatus of a wet friction material according to claim 1, further comprising:

a slide guide fixed between an upper position and a lower position of the molding apparatus and extending in a vertical direction, the slide guide being erected at a lateral center of the pantograph-type open-close link mechanism and facing centers of the crossed link bars, and the slide guide having substantially a square cross-section and defining a guide bar; and a plurality of sliders fixed on the pantograph-type open-close link mechanism at predetermined ones of the centers of the crossed link bars, each of the sliders being fitted to the slide guide to slide vertically along the slide guide so that a vertical movement of the pantograph-type open-close link mechanism is guided by engagement of the sliders and the slide guide.

8. A molding apparatus of a wet friction material according to claim 7, in which each of the sliders has a linearly and vertically extending guide groove so that the sliders are fitted onto the slide guide, while being in contact with a pair of side surfaces and a front surface of the slide guide, to slide vertically along the slide guide via the guide groove.

* * * * *